United States Patent
Aoyama

(10) Patent No.: US 12,445,564 B2
(45) Date of Patent: Oct. 14, 2025

(54) ROLE MANAGEMENT SYSTEM, ROLE MANAGEMENT DEVICE, AND MULTIFUNCTION PRINTER

(71) Applicant: TOSHIBA TEC KABUSHIKI KAISHA, Tokyo (JP)

(72) Inventor: Ryuichi Aoyama, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 392 days.

(21) Appl. No.: 17/943,338

(22) Filed: Sep. 13, 2022

(65) Prior Publication Data
US 2024/0089394 A1    Mar. 14, 2024

(51) Int. Cl.
*H04N 1/44* (2006.01)
*G06F 21/60* (2013.01)
*G06F 21/62* (2013.01)

(52) U.S. Cl.
CPC ......... *H04N 1/4433* (2013.01); *G06F 21/604* (2013.01); *G06F 21/629* (2013.01); *G06F 2221/2141* (2013.01)

(58) Field of Classification Search
CPC ...... G06F 3/1238; G06F 3/1222; G06F 21/31; H04L 63/08
See application file for complete search history.

(56) References Cited

U.S. PATENT DOCUMENTS

| | | | |
|---|---|---|---|
| 9,565,174 B2 | 2/2017 | Mihara | |
| 2018/0097945 A1* | 4/2018 | Maeda | H04N 1/00244 |
| 2020/0358778 A1* | 11/2020 | Gopinathapai | G06F 21/604 |
| 2021/0385356 A1* | 12/2021 | Okabe | H04N 1/4433 |
| 2022/0405031 A1* | 12/2022 | Araki | H04N 1/00843 |
| 2023/0134567 A1* | 5/2023 | Hayashi | H04N 1/00514 358/1.14 |
| 2023/0262092 A1* | 8/2023 | Griffin | H04L 63/102 726/26 |
| 2023/0289477 A1* | 9/2023 | Kashiwagi | G06F 21/6218 |

FOREIGN PATENT DOCUMENTS

JP    2020-52759    4/2020

* cited by examiner

*Primary Examiner* — Chris Parry
*Assistant Examiner* — Abderrahmen Chouat
(74) *Attorney, Agent, or Firm* — Amin, Turocy & Watson, LLP

(57) ABSTRACT

According to one embodiment, a role management system includes a first management unit, a second management unit, an acquisition unit, and a first control unit. The first management unit manages a role assigned to a user identified by an identifier in correlation with the identifier. The second management unit manages a role to be assigned to an assignee identified by an identifier in correlation with the identifier. The acquisition unit individually acquires two identifiers as a first identifier and a second identifier. The first control unit controls the first management unit so that the role managed by the second management unit in correlation with an identifier acquired as the second identifier by the acquisition unit is managed as a role assigned to a user identified by an identifier acquired as the first identifier by the acquisition unit.

15 Claims, 4 Drawing Sheets

ROLE MANAGEMENT SYSTEM, ROLE MANAGEMENT DEVICE, AND MULTIFUNCTION PRINTER

FIELD

Embodiments described herein relate generally to a role management system, a role management device, and a multifunction printer.

BACKGROUND

Management of a role related to the usage of a function provided by a multifunction printer may be performed. For example, a certain function is made available only to a user who is assigned a role related to the function.

In related art, such role management is performed based on a data table configured to manage which role is assigned to a user. Accordingly, in order to assign a new role to a user, the data table is required to be updated, and as such, a heavy burden is imposed on a worker.

In consideration of the above-described circumstances, it is desirable to easily assign a new role to a user.

DETAILED DESCRIPTION

In general, according to one embodiment, a role management system includes a first management unit, a second management unit, an acquisition unit, and a first control unit. The first management unit manages a role assigned to a user identified by an identifier in correlation with the identifier. The second management unit manages a role to be assigned to an assignee identified by an identifier in correlation with the identifier. The acquisition unit individually acquires two identifiers as a first identifier and a second identifier. The first control unit controls the first management unit so that the role managed by the second management unit in correlation with an identifier acquired as the second identifier by the acquisition unit is managed as a role assigned to a user identified by an identifier acquired as the first identifier by the acquisition unit.

Hereinafter, an example of an embodiment will be described using the drawings. In the embodiment, a role management system configured to manage a role related to a function of a multifunction printer will be described as an example.

Figure 1:
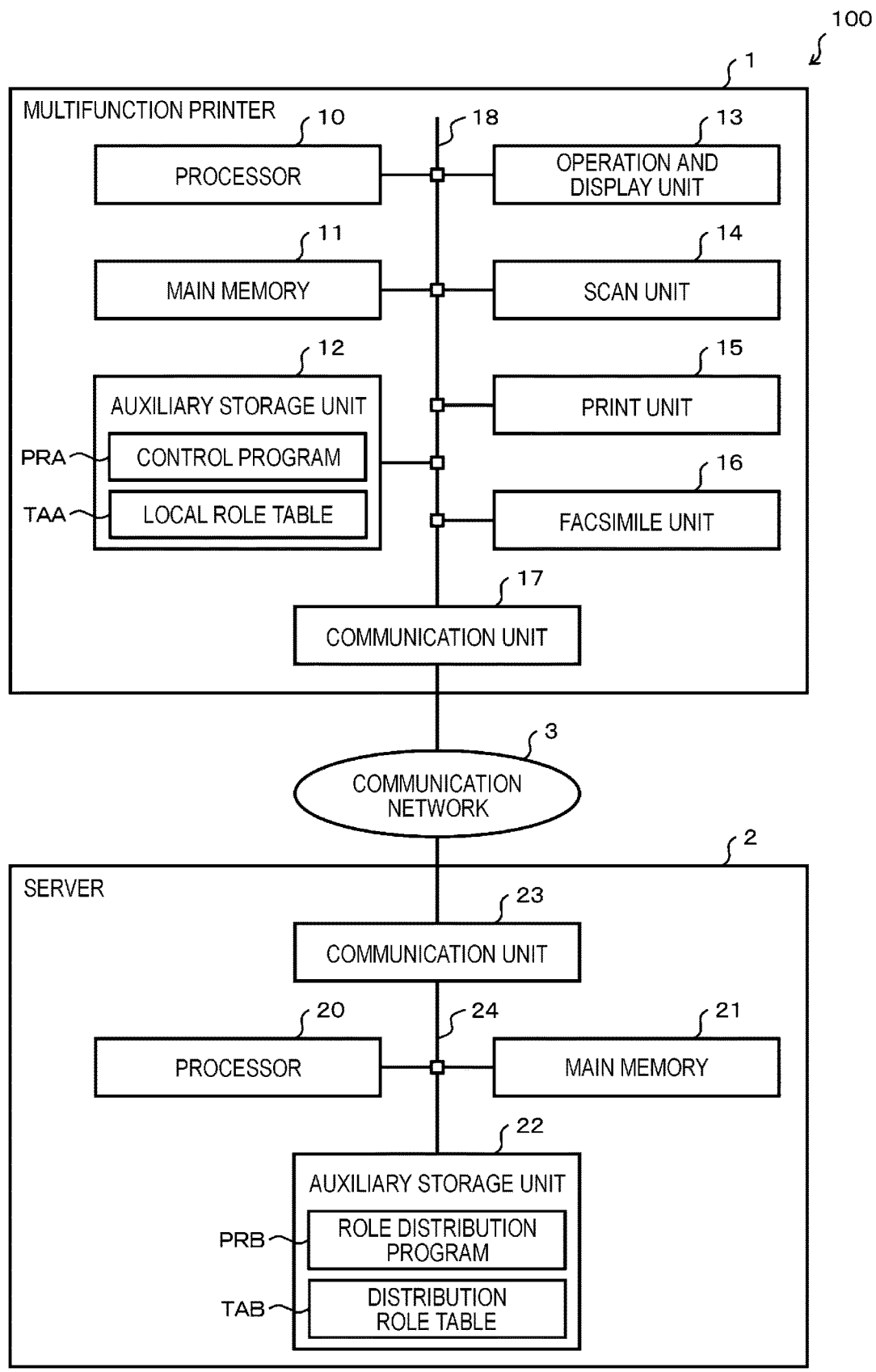
FIG. 1 is a block diagram showing a configuration of a role management system according to an embodiment and a main circuit configuration of a multifunction printer and a server provided in the role management system.

FIG. 1 is a block diagram showing a configuration of a role management system 100 according to the embodiment and a main circuit configuration of a multifunction printer 1 and a server 2 provided in the role management system 100.

The role management system 100 is configured to enable communication between the multifunction printer 1 and the server 2 via a communication network 3.

The multifunction printer 1 provides a plurality of functions to a user. The functions of the multifunction printer 1 mainly include functions related to image formation such as a print function and a copy function. The functions of the multifunction printer 1 may include a function which is not related to the image formation, such as an image file management function. Further, the multifunction printer 1 can add a function thereto by mounting optional equipment therein or installing an application program therein. For example, it is assumed to add a function of writing data to a wireless tag mounted on a medium which is an image formation target by mounting a communication unit configured to perform communication with the wireless tag. For example, it is assumed to add a function of using a web service by installing an application program configured to use the corresponding web service provided by a server (not shown) other than the server 2 via the communication network 3. For example, it is assumed to add a workflow support function by installing a workflow application. However, the function provided by the multifunction printer 1 or the function that can be added to the multifunction printer 1 may be any function. The multifunction printer 1 has a function of managing a role assigned to a user as described later, and is an example of a role management device.

The server 2 is an information processing device configured to manage a role to be additionally assigned to a user of the multifunction printer 1, and to perform information processing of distributing the role to the multifunction printer 1. That is, the server 2 corresponds to a role distribution device.

The communication network 3 enables information processing devices to exchange data with each other. As the communication network 3, the Internet, a virtual private network (VPN), a local area network (LAN), a public communication network, a mobile communication network, and the like can be used by itself or in an appropriate combination thereof. As an example, the Internet is used as the communication network 3.

The multifunction printer 1 includes a processor 10, a main memory 11, an auxiliary storage unit 12, an operation and display unit 13, a scan unit 14, a print unit 15, a facsimile unit 16, a communication unit 17, and a transmission line 18. The processor 10, the main memory 11, the auxiliary storage unit 12, the operation and display unit 13, the scan unit 14, the print unit 15, the facsimile unit 16, and the communication unit 17 are connected to each other via the transmission line 18.

The processor 10, the main memory 11, and the auxiliary storage unit 12 are connected to each other by the transmission line 18, thereby forming a computer configured to perform information processing of controlling the multifunction printer 1.

The processor 10 corresponds to a center portion of the computer. The processor 10 executes information processing of controlling respective units configured to implement various functions as the multifunction printer 1 according to information processing programs such as an operating system and an application program.

The main memory 11 corresponds to a main storage portion of the computer. The main memory 11 includes a read-only memory area and a rewritable memory area. The main memory 11 stores a part of the information processing programs in the read-only memory area. Further, the main memory 11 may store data, which is necessary for the processor 10 to execute processing of controlling each unit, in the read-only memory area or the rewritable memory area. The main memory 11 uses the rewritable memory area as a work area by the processor 10.

The auxiliary storage unit 12 corresponds to an auxiliary storage portion of the computer. For example, the auxiliary storage unit 12 can use an electric erasable programmable read-only memory (EEPROM), a hard disc drive (HDD), a solid state drive (SSD), or other well-known various storage devices. The auxiliary storage unit 12 stores data used by the processor 10 in order to perform various kinds of processing and data generated by the processing of the processor 10. The auxiliary storage unit 12 may store the information processing program. In the embodiment, the auxiliary storage unit 12 stores a control program PRA which is one of the information processing programs. The control program PRA manages a role (hereinafter referred to as a local role) assigned to a user with respect to the function of the multifunction printer 1, and describes information processing of controlling function execution based on the local role. A part of the storage area of the auxiliary storage unit 12 is used as an area in which a local role table TAA is stored. Details of the local role table TAA will be described later.

The operation and display unit 13 inputs operation by an operator and displays various kinds of information to the operator. The operation and display unit 13 may appropriately include various operation devices and display devices such as a touch panel, a keyboard, a key switch, a light emitting diode (LED) lamp, or a liquid crystal display panel. The operator is often a user of the multifunction printer 1. However, a worker performing maintenance of the multifunction printer 1 may be an operator. The operation and display unit 13 may include a reader configured to read an identifier of a user recorded in an identification (ID) card.

The scan unit 14 reads an original and generates image data of an image shown on the original.

The print unit 15 prints an image indicated by the image data on a recording paper. The printing unit 15 is provided with a well-known print device such as an electrophotographic image forming device.

The facsimile unit 16 performs various kinds of well-known processing of performing image communication conforming to the facsimile standard via a communication network (not shown) such as a public switched telephone network (PSTN).

The communication unit 17 executes communication processing of transmitting and receiving data via the communication network 3. As the communication unit 17, for example, an existing communication device conforming to a communication system adopted in the communication network 3 can be used.

The transmission line 18 includes an address bus, a data bus, a control signal line, and the like, and transmits data and a control signal exchanged between the connected units.

The server 2 includes a processor 20, a main memory 21, an auxiliary storage unit 22, a communication unit 23, and a transmission line 24. For example, a general-purpose server device suitable for a web server can be used as the hardware of the server 2.

The processor 20, the main memory 21, and the auxiliary storage unit 22 are connected to each other by the transmission line 24, thereby forming a computer configured to perform information processing of implementing a function as the server 2.

The processor 20 corresponds to a center portion of the computer. The processor 20 executes information processing based on information processing programs such as an operating system, middleware, and an application program stored in the main memory 21 and the auxiliary storage unit 22, thereby executing information processing for the management.

The main memory 21 corresponds to a main storage portion of the computer. The main memory 21 includes a read-only memory area and a rewritable memory area. The main memory 21 stores a part of the information processing programs in the read-only memory area. Further, the main memory 21 may store data, which is necessary for the processor 20 to execute processing of controlling each unit, in the read-only memory area or the rewritable memory area. The main memory 21 uses the rewritable memory area as a work area by the processor 20.

The auxiliary storage unit 22 corresponds to an auxiliary storage portion of the computer. The auxiliary storage unit 22 is provided with well-known storage devices such as an EEPROM, an HDD, and an SSD. The auxiliary storage unit 22 stores data used by the processor 20 in order to perform various kinds of information processing and data generated by the processing by the processor 20. The auxiliary storage unit 22 may store the information processing program. In the embodiment, the auxiliary storage unit 22 stores a role distribution program PRB which is one of the information processing programs. The role distribution program PRB describes information processing of distributing role information representing contents of a role to be assigned to a user in response to an inquiry from the multifunction printer 1. A part of the storage area of the auxiliary storage unit 22 is used as a distribution role table TAB. Details of the distribution role table TAB will be described later.

The communication unit 23 executes communication processing of transmitting and receiving data via the communication network 3. As the communication unit 23, for example, an existing communication device conforming to a communication system adopted in the communication network 3 can be used.

The transmission line 24 includes an address bus, a data bus, a control signal line, and the like. The transmission line 24 transmits data and a signal exchanged between the connected units.

Figure 2:
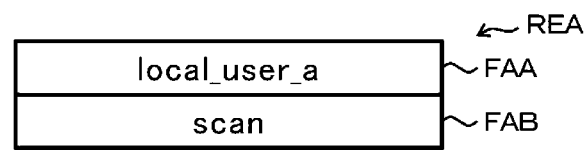
FIG. 2 is a diagram schematically showing one of data records provided in a local role table in FIG. 1.

FIG. 2 is a diagram schematically showing one of data record REAs provided in the local role table TAA.

The local role table TAA is a data table formed of a set of the data record REAs having a configuration shown in FIG. 2.

The data record REA includes two fields FAA and FAB. An identifier of a user of the multifunction printer 1 is set in the field FAA. Role information on a role assigned to a user identified by an identifier set in the field FAA is set in the field FAB.

Accordingly, in the example of FIG. 2, the data record REA is a record configured to manage that a role represented by role information specified as "scan" is assigned to a user identified by an identifier specified as "local_user_a". The role information specified as "scan" represents that the usage of a scan function is permitted. However, "local_user_a" and "scan" are schematically expressed and are different from actual data.

Figure 3:
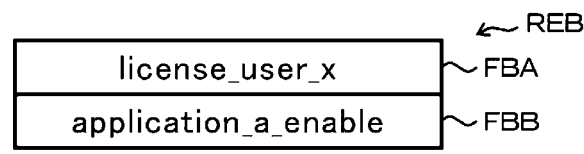
FIG. 3 is a diagram schematically showing one of data records provided in a distribution role table in FIG. 1.

FIG. 3 is a diagram schematically showing one of data record REBs provided in the distribution role table TAB.

The distribution role table TAB is a data table formed of a set of the data record REBs having a configuration shown in FIG. 3.

The data record REB includes two fields FBA and FBB. An identifier of a user to be assigned a role is set in the field FBA. Role information on a role to be assigned to a user identified by an identifier set in the field FBA is set in the field FBB.

Accordingly, in the example of FIG. 3, the data record REB is a record configured to manage that a user identified by an identifier specified as "licence_user_x" is an assignee to be assigned a role represented by role information specified as "application_a_enable". The role information specified as "application_a_enable" represents that the usage of an application program specified as "application_a" is permitted. However, "licence_user_x" and "application_a_enable" are schematically expressed and are different from actual data.

The identifier set in the field FAA of the data record REA and the identifier set in the field FBA of the data record REB are determined independently of each other. In the following description, if it is particularly necessary to distinguish between the identifier set in the field FAA and the identifier set in the field FBA, the former is referred to as a local identifier and the latter is referred to as a global identifier.

For example, the local identifier is determined to identify individual employees of an office at which the multifunction printer 1 is used. For example, the global identifier is notified to a plurality of employees in the office. In this case, the global identifier becomes an identifier configured to identify the plurality of notified employees. Further, for example, the global identifier may be notified only to one employee in the office. In this case, the global identifier becomes an identifier configured to identify one notified employee. Additionally, the global identifier may respectively notify one or more users using the multifunction printer 1 and one or more users who are different from the user of the multifunction printer 1 and use another one or more multifunction printers of the same type as the multifunction printer 1. In this case, the global identifier becomes an identifier configured to identify the plurality of notified users.

Next, an operation of the role management system 100 having the above-described configuration will be described.

A manager or the like of the multifunction printer 1 appropriately determines an assignee to be assigned various roles related to the usage of various functions of the multifunction printer 1. In the multifunction printer 1, the processor 10 stores, in the local role table TAA, the data record REA in which a local identifier configured to identify an assignee and role information on a role to be assigned to the assignee are respectively set in the fields FAA and FAB, in response to a predetermined operation in the operation and display unit 13 by an administrator or the like. Accordingly, the processor 10 manages to which user various roles related to the multifunction printer 1 are assigned based on the local role table TAA. Thus, if the processor 10 executes information processing based on the control program PRA, a computer having the processor 10 as a center portion thereof functions as the first management unit.

On the other hand, for example, a new role related to the multifunction printer 1 may be generated if an application program configured to add a new function to the multifunction printer 1 is released. In this case as well, a new role can be assigned to a user by updating the local role table TAA in the same manner as described above. However, if a new role is assigned to each of the plurality of users, a workload of an administrator becomes large in the above-described method.

If the multifunction printer 1 is in an operation state of providing various functions to a user, the processor 10 executes information processing based on the control program PRA (hereinafter referred to as control processing) in order to execute the function desired by the user. Further, the server 2 executes information processing based on the role distribution program PRB (hereinafter referred to as distribution processing).

Figure 4:
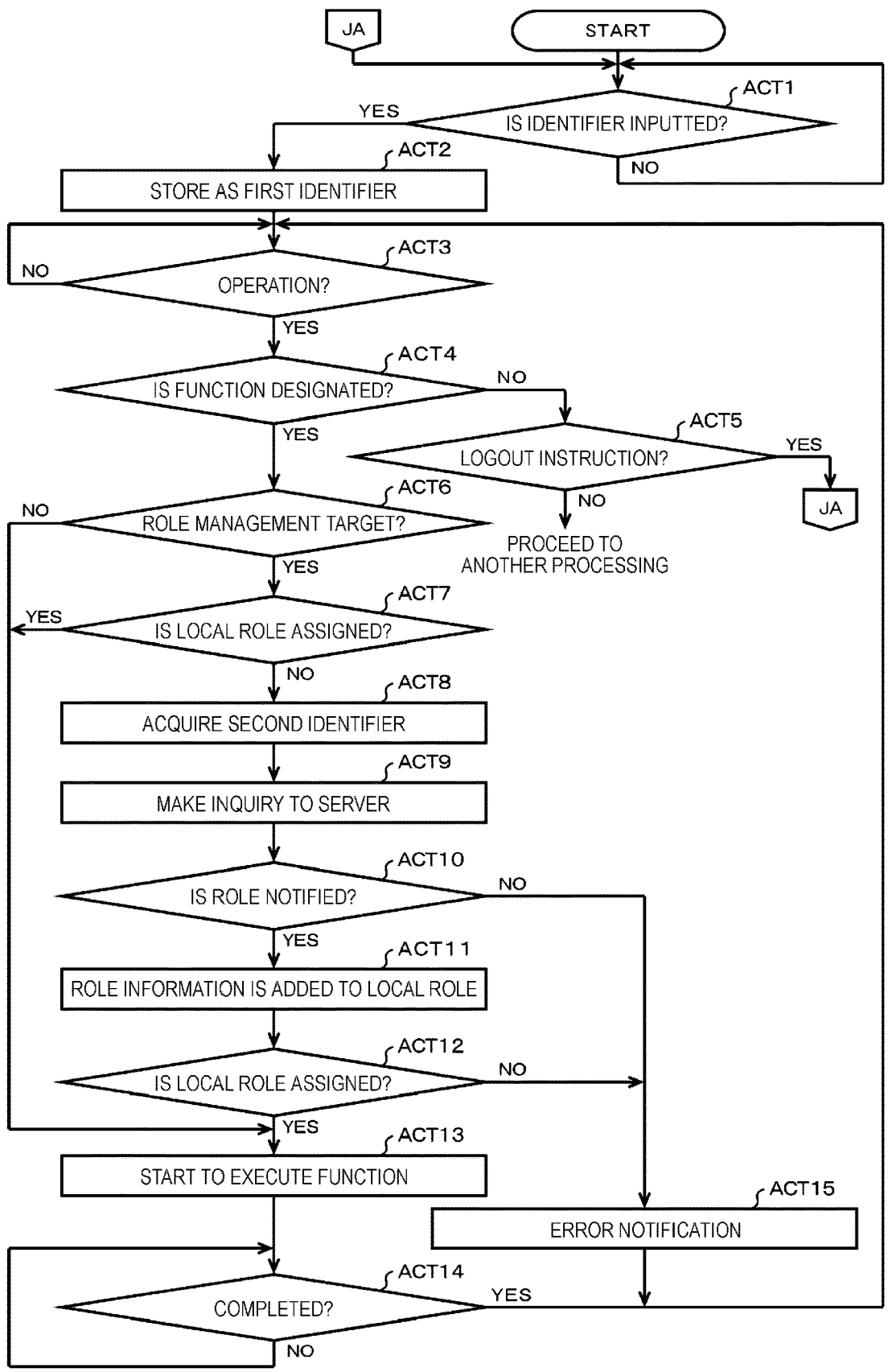
FIG. 4 is a flowchart of control processing by a processor provided in the multifunction printer in FIG. 1.

FIG. 4 is a flowchart of the control processing by the processor 10.

Figure 5:
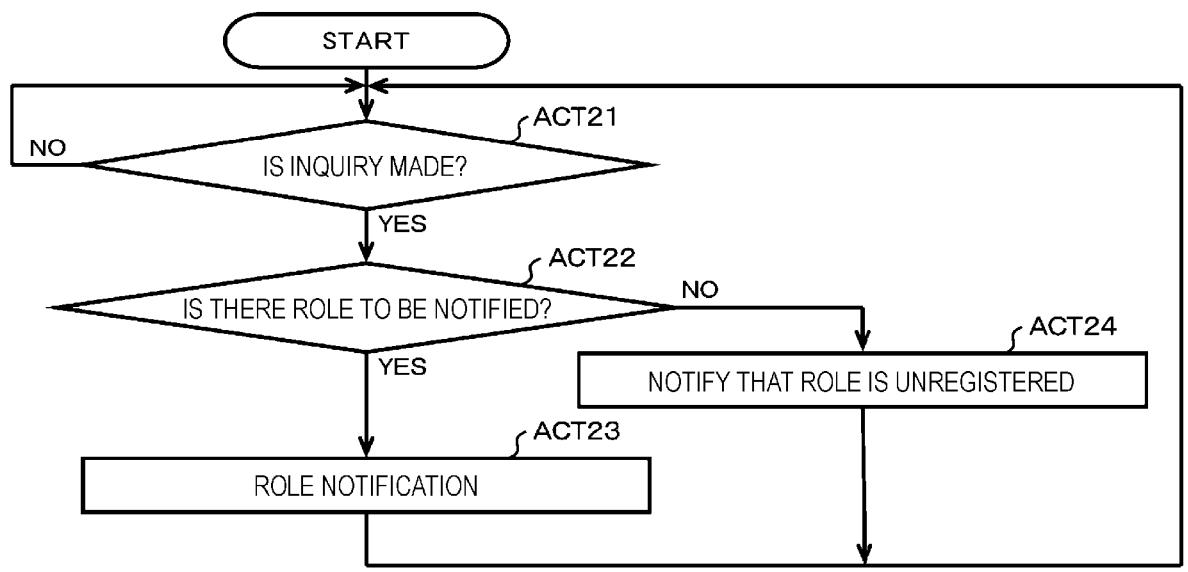
FIG. 5 is a flowchart of distribution processing by a processor provided in the server in FIG. 1.

FIG. 5 is a flowchart of the distribution processing by the processor 20.

In ACT 1 of FIG. 4, the processor 10 waits for an identifier of a user using the multifunction printer 1 to be inputted.

If a user starts to use the multifunction printer 1, the user performs a predetermined operation of inputting an identifier. The operation, for example, allows a reader provided in the operation and display unit 13 to read an identifier stored in an ID card. Further, the operation designates a character string corresponding to the identifier using a touch panel provided in the operation and display unit 13.

If the operation of inputting the identifier is performed, the processor 10 determines YES in ACT 1 and proceeds to ACT 2.

In ACT 2, the processor 10 stores the inputted identifier as the first identifier in the main memory 11 or the auxiliary storage unit 12.

In ACT 3, the processor 10 waits for some operation to be performed by the user. If the operation is performed by the user, the processor 10 determines YES and proceeds to ACT 4.

In ACT 4, the processor 10 confirms whether the performed operation is an operation of designating a function to be executed. If the processor 10 cannot confirm the operation of designating the function, the processor 10 determines NO and proceeds to ACT 5.

In ACT 5, the processor 10 confirms whether the performed operation is an operation of instructing logout. If the processor 10 can confirm the operation of the instructing logout, the processor 10 determines YES and returns to a standby state in ACT 1. On the other hand, if the processor 10 cannot confirm the operation of instructing logout, the processor 10 determines NO, specifies contents of the operation, and proceeds to processing of executing an operation corresponding to the operation. A description of the processing is omitted.

If the performed operation is the operation of designating the function to be executed, the processor 10 determines YES in ACT 4 and proceeds to ACT 6.

In ACT 6, the processor 10 specifies a function that the user desires to use based on the operation, and confirms whether the function is determined as a role management target. Whether or not each of various functions provided to a user by the multifunction printer 1 is subject to the role management target is predetermined. This setting may be appropriately determined by, for example, a designer or a manager of the multifunction printer 1. When confirming that the function is determined as the role management target, the processor 10 proceeds to ACT 7 as YES. All functions may be subject to the role management target regardless of the setting. In this case, the processor 10 may proceed to ACT 7 when determining YES in ACT 4.

In ACT 7, the processor 10 confirms whether a local role is assigned to the user. For example, the processor 10 searches for, from the local role table TAA, the data record REA in which the first identifier stored in ACT 2 is set in the field FAA and the role information on the function designated to be executed is set in the field FAB. If the corresponding data record REA is not found, the processor 10 determines NO as meaning that the local role is not assigned, and proceeds to ACT 8.

Thus, after specifying a function that a user intends to use, the processor 10 determines whether a role related to the usage of the function is included in a role assigned to the user. That is, if the processor 10 executes the information processing based on the control program PRA, a computer having the processor 10 as a center portion thereof functions as a specification unit and a determination unit.

In ACT 8, the processor 10 acquires the second identifier. The processor 10 urges a user to input a global identifier notified to the user by, for example, screen display on the operation and display unit 13. Here, the global identifier is required to be inputted to allow the user to receive a role related to a function that the user intends to use. The user inputs the global identifier by, for example, a predetermined operation in the operation and display unit 13. Then, the processor 10 acquires the global identifier inputted as described above as the second identifier. Thus, if the processor 10 executes the information processing based on the control program PRA, a computer having the processor 10 as a center portion thereof functions as the acquisition unit configured to individually acquire the first identifier and the second identifier.

In ACT 9, the processor 10 makes an inquiry to the server 2 with the notification of the second identifier acquired in ACT 8.

In ACT 21 of FIG. 5, the processor 20 of the server 2 waits for an inquiry to be made via the communication network 3. In response to the inquiry made by the processor 10 as described above, the processor 20 determines YES and proceeds to ACT 22.

In ACT 22, the processor 20 confirms whether there is a role to be notified with respect to the inquiry. For example, the processor 20 searches for, from the distribution role table TAB, the data record REB in which the global identifier, configured to match the second identifier notified when making an inquiry, is set in the field FBA. Then, the processor 20 determines that there is a role to be notified, for example, if the corresponding data record REB is found. If the processor 20 can determine that there is a role to be notified, the processor 20 determines YES and proceeds to ACT 23.

As described above, the processor 20 uses the distribution role table TAB to manage a role to be assigned to an assignee in correlation with the global identifier. The processor 20 notifies the multifunction printer 1 of the role managed in this manner as a response to the inquiry from the multifunction printer 1. Thus, if the processor 20 executes the information processing based on the role distribution program PRB, a computer having the processor 20 as a center portion thereof functions as the second management unit and a notification unit.

In ACT 23, the processor 20 notifies the multifunction printer 1 of role information set in the field FBB of the data record REB found as described above as a response to the inquiry. Thereafter, the processor 20 returns to the standby state in ACT 21.

If the processor 20 cannot determine that there is a role to be notified, the processor 20 determines NO in ACT 22 and proceeds to ACT 24.

In ACT 24, the processor 20 notifies the multifunction printer 1 that the role related to the second identifier, which is a target of the inquiry, is unregistered as a response to the inquiry. Thereafter, the processor 20 returns to the standby state in ACT 21.

In the multifunction printer 1, the processor 10 proceeds to ACT 10 if the inquiry made in ACT 9 in FIG. 4 is executed.

In ACT 10, the processor 10 confirms whether the role is notified or not based on the response made from the server 2 as described above with respect to the inquiry made in ACT 9. Then, the processor 20 executes ACT 23 in FIG. 5 to notify the role information. When receiving this notification, the processor 10 determines YES and proceeds to ACT 11. Accordingly, if the processor 10 executes the information processing based on the control program PRA, a computer having the processor 10 as a center portion thereof functions as a notification receiving unit.

In ACT 11, the processor 10 adds the notified role information to the local role. For example, the processor 10 adds, to the local role table TAA, a new data record REA in which the first identifier stored in ACT 2 is set in the field FAA and the role information notified this time is set in the field FAB. Thus, if the processor 10 executes the information processing based on the control program PRA, a computer having the processor 10 as a center portion thereof functions as the first control unit.

Figure 6:
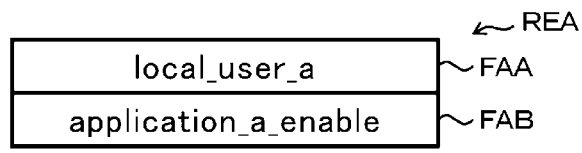
FIG. 6 is a diagram showing an example of a data record added to the local role table in FIG. 1.

FIG. 6 is a diagram showing an example of the data record REA added to the local role table TAA.

The data record REA shown in FIG. 6 is an example of the case in which the first identifier stored in ACT 2 is specified as "local_user_a", the second identifier acquired in ACT 8 is specified as "license_user_x", and the data record REB shown in FIG. 3 is included in the distribution role table TAB. That is, as a response to an inquiry from the multifunction printer 1, the server 2 notifies the multifunction printer 1 of the role information specified as "application_a_enable" correlated with "license_user_x", thereby forming the data record REA in which "local_user_a" and "application_a_enable" are set in the fields FAA and FAB, respectively. Here, the data record REA is newly added to the local role table TAA. Accordingly, the role specified as "application_a_enable" is assigned to the user identified by "local_user_a".

In ACT 12, for example, the processor 10 confirms whether the local role is assigned to the user in the same manner as ACT 7. Here, the processor 10 determines YES if the data record REA added in ACT 11 is the corresponding data record. If the processor 10 determines YES, the processor 10 proceeds to ACT 13.

When determining NO in ACT 6 because the function designated to be executed is not determined as a role management target, the processor 10 passes ACT 7 to ACT 12 and proceeds to ACT 13. Additionally, if the corresponding data record REA is found in ACT 7, the processor 10 determines that the local role is assigned to the user and determines YES. After that, the processor 10 passes ACT 8 to ACT 12 and proceeds to ACT 13.

In ACT 13, the processor 10 starts to execute the function designated to be executed. The processor 10 executes, for example, information processing of controlling each unit configured to execute the function designated to be executed in parallel with the control processing shown in FIG. 4. Alternatively, the processor 10 instructs any unit to perform an operation of executing the function designated to be executed. Thus, if the processor 10 executes the information processing based on the control program PRA, a computer having the processor 10 as a center portion thereof functions as a second control unit.

In ACT 14, the processor 10 waits for completion of the execution of the function. If the processor 10 can confirm the completion thereof, the processor 10 determines YES and returns to the standby state in ACT 3.

If the server 2 notifies that the role is unregistered as a response to the inquiry made in ACT 9, the processor 10 determines NO in ACT 10 and proceeds to ACT 15. If a new data record REA is added in ACT 11 but the added data record REA is not related to the execution of the function designated to be executed, the processor 10 determines NO in ACT 12 and proceeds to ACT 15.

In ACT 15, the processor 10 performs an error notification. The error notification herein is used to notify a user that the designated function cannot be executed because the role is not assigned. For example, the processor 10 displays a predetermined screen on the operation and display unit 13 to indicate that the designated function cannot be executed because the role is not assigned. Thereafter, the processor 10 returns to the standby state in ACT 3.

The role management system 100 is assumed to have the following usage patterns.

It is assumed that an application program (herein referred to as a new program) to be additionally installed in the multifunction printer 1 is newly released. In this case, in response to a request made by a provider of the new program, the processor 20 adds, to the distribution role table TAB, a new data record REA in which a global identifier and role information on the new program are set. Further, the provider of the new program notifies an assignee to be assigned the role related to the new program of the global identifier using any method. As an example, the global identifier is first notified from the provider to a manager of the multifunction printer 1. Then, the manager of the multifunction printer 1 notifies an assignee among the plurality of users of the multifunction printer 1 of the global identifier. The manager of the multifunction printer 1 installs the new program in the multifunction printer 1. If a user of the multifunction printer 1 designates the execution of the function provided by the new program for the first time, the role related to the new program is not assigned to the user. The user inputs the global identifier notified as described above to the multifunction printer 1 so that the processor 10 can acquire the global identifier as the second identifier. Then, the multifunction printer 1 acquires role information on the new program from the server 2 based on the global identifier, and adds, to the local role table TAA, the data record REA in which the role information is set together with the local identifier of the current user. Accordingly, the role related to the new program is assigned to the user, and as such, the user can use the function provided by the multifunction printer 1 based on the new program.

Here, if an administrator notifies a plurality of users of the global identifier, the local role is assigned to the users every time those users designate the execution of the function provided based on the new program. As a result, it is possible to easily assign a new role compared to the case in which an administrator performs work to cause the data record REA related to each of the plurality of users to be stored in the local role table TAA.

If a plurality of multifunction printers 1 can communicate with the server 2 via the communication network 3, each user of the plurality of multifunction printers 1 is set to be an assignee, thereby making it possible to assign a local role to any one of the plurality of multifunction printers 1 only by adding one data record REB on the server 2. That is, for example, a local role can be assigned to each of the multifunction printers 1 installed in each of the separate offices only by adding one data record REB on the server 2. Alternatively, a local role can be assigned to one user for each of the plurality of multifunction printers 1 installed in one office only by adding one data record REB on the server 2.

According to the role management system 100 as described above, it is possible to easily assign a new role to a user.

In the embodiment, various modifications can be implemented as follows.

In the embodiment, the processor 10 proceeds to processing of making an inquiry to the server 2 if a role related to execution of a designated function is not assigned to a user. However, the processor 10 may make an inquiry to the server 2 at any timing different from this timing. For example, the processor 10 includes an operation of instructing assignment of a role in one of the operations received during the standby state in ACT 3 of FIG. 4. Then, if the operation is performed, the processor 10 executes the same processing as that of ACT 8 to ACT 11 and ACT 15. The processor 10 returns to the standby state in ACT 3 after finishing the processing corresponding to ACT 11 or ACT 15.

The distribution role table TAB may be stored in the auxiliary storage unit 12 of the multifunction printer 1, and the processor 10 may execute processing corresponding to ACT 22 in FIG. 5 in place of ACT 10 in FIG. 4. In this case, the processor 10 proceeds to ACT 11 in FIG. 4 when determining YES in the processing corresponding to ACT 22, and proceeds to ACT 15 when determining NO. In this case, the role management system is implemented as a single device.

The processing of ACT 6 to ACT 12 in FIG. 4 may be executed by a role management device different from the multifunction printer in response to a request from the multifunction printer while the first identifier, the second identifier, and the notification of the function to be executed are received from the multifunction printer. In this case, the role management device notifies the multifunction printer that the role is assigned in place of ACT 13, and notifies the multifunction printer that the role is not assigned in place of ACT 15.

When making an inquiry, the processor 10 may notify the server 2 of a role necessary for execution of the designated function together with the second identifier. Only if the distribution role table TAB includes the data record REB in which the same global identifier as the second notified identifier and the role information on the notified role are set, the processor 20 may notify the multifunction printer 1 of the role information set in the corresponding data record REB. In the case in which the processor 10 receives the notification of the role information as a response to the inquiry, only if the role information is related to the role necessary for the execution of the designated function, the local role table TAA may be updated. In this manner, the local role table TAA is not updated if a global identifier unrelated to the designated function is erroneously inputted by a user.

A role to be managed is not limited to a role related to a function of the multifunction printer 1, but may be any role.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A role management system, comprising:
a memory that stores a program; and
a processor that, upon execution of the program, is configured to operate as:
   a first management component configured to manage a first role assigned to a user identified by a first identifier in correlation with the first identifier;
   a second management component configured to manage a second role to be assigned to an assignee identified by a second identifier in correlation with the second identifier;
   an acquisition component configured to individually acquire the first identifier and the second identifier; and
   a first controller configured to control the first management component so that the second role managed by the second management component in correlation with the second identifier acquired by the acquisition component is added to the first role and managed, by the first management component, as the first role assigned to the user identified by the first identifier acquired by the acquisition component, wherein
the acquisition component acquires the second identifier if the first role managed by the first management component does not include a required role in correlation with the first identifier, and
the first controller controls the first management component in response to acquisition of the second identifier by the acquisition component so that the second role managed by the second management component in correlation with the second identifier is managed as the first role assigned to the user identified by the first identifier acquired by the acquisition component,
wherein the processor is further configured to operate as:
a specification component configured to specify a function that the user intends to use among a plurality of functions of a device; and
a determination component configured to determine whether a role related to usage of the function specified by the specification component is included in the first role managed by the first management component in correlation with the first identifier acquired by the acquisition component, wherein
the acquisition component acquires the first identifier before the function is specified by the specification component, and acquires the second identifier in response to a determination by the determination component that the role is not included in the first role.

2. The role management system according to claim 1, wherein
the function is a copy function or a print function.

3. The role management system according to claim 1, wherein
the function is writing data to a wireless tag.

4. The role management system according to claim 1, wherein the processor is further configured to operate as:
a role management device including the first management component, the acquisition component, and the first controller; and
a role distribution device including the second management component, wherein
the role management device further includes a notification receiving component configured to make an inquiry to the role distribution device with a first notification of the second identifier acquired by the acquisition component, and to receive a second notification of the second role from the role distribution device, and
the role distribution device further includes a notification component configured to notify, as a response to the inquiry, the role management device of the second role managed by the second management component in correlation with the second identifier notified from the role management device.

5. The role management system according to claim 1, wherein
the role management system is configured to communicate between a multifunction printer and a server via a communication network.

6. The role management system of claim 1,
wherein the first management component manages the first role based on a first data record of a local role table, the first data record comprises a first local field and a second local field, the first local field comprises the first identifier, and the second local field comprises first role information associated with the first role assigned to the user;
wherein the second management component manages the second role based on a second data record of a distribution table, the second data record comprises a first distribution field and a second distribution field, the first distribution field comprises the second identifier, and the second distribution field comprises second role information associated with the second role assigned to the assignee.

7. The role management system of claim 1,
wherein the user identified by the first identifier and the assignee identified by the second identifier are a same user.

8. A role management device configured to form a second role management system together with a role distribution device including a second management component configured to manage a second role to be assigned to an assignee identified by a second identifier in correlation with the second identifier, the role management device comprising:
a memory that stores a program; and
a processor that, upon execution of the program, is configured to operate as:
   a first management component configured to manage a first role assigned to a user identified by a first identifier in correlation with the first identifier;
   an acquisition component configured to individually acquire the first identifier and the second identifier;
   a notification receiving component configured to make an inquiry to the role distribution device, and to receive notification of the second role managed by the second management component in correlation with the second identifier acquired by the acquisition component; and
   a first controller configured to control the first management component so that the second role related to the notification received by the notification receiving component is added to the first role and managed, by the first management component, as the first role assigned to the user identified by the first identifier acquired by the acquisition component, wherein
the acquisition component acquires the second identifier if the first role managed by the first management component does not include a required role in correlation with the first identifier, and
the notification receiving component makes the inquiry to the role distribution device in response to acquisition of the second identifier by the acquisition component, wherein the processor is further configured to operate as:
a specification component configured to specify a function that the user intends to use among a plurality of functions of a device; and
a determination component configured to determine whether a role related to usage of the function specified by the specification component is included in the first role managed by the first management component in correlation with the first identifier acquired by the acquisition component, wherein
the acquisition component acquires the first identifier before the function is specified by the specification component, and acquires the second identifier in response to a determination by the determination component that the role is not included in the first role.

9. The role management device according to claim 8, wherein
the function is a copy function or a print function.

10. The role management device according to claim 8, wherein
the function is writing data to a wireless tag.

11. The role management device according to claim 8, wherein
the role management device is configured to communicate between a multifunction printer and a server via a communication network.

12. A multifunction printer configured to form a role management system together with a role distribution device including a second management component configured to manage a second role to be assigned to an assignee identified by a second identifier in correlation with the second identifier, the multifunction printer comprising:
a memory that stores a program; and
a processor that, upon execution of the program, is configured to operate as:
a first management component configured to manage a first role assigned to a user identified by a first identifier in correlation with the first identifier;
an acquisition component configured to individually acquire the first identifier and the second identifier;
a notification receiving component configured to make an inquiry to the role distribution device, and to receive notification of the second role managed by the second management component in correlation with the second identifier acquired by the acquisition component;
a first controller configured to control the first management component so that the second role related to the notification received by the notification receiving component is added to the first role and managed, by the first management component, as the first role assigned to the user identified by the first identifier acquired by the acquisition component; and
a second controller configured to provide the user with a function related to the first role managed by the first management component in correlation with the first identifier acquired by the acquisition component, among a plurality of functions of the multifunction printer, wherein the processor is further configured to operate as:
a specification component configured to specify the function that the user intends to use among the plurality of functions of the multifunction printer; and
a determination component configured to determine whether a role related to usage of the function specified by the specification component is included in the first role managed by the first management component in correlation with the first identifier acquired by the acquisition component, wherein
the acquisition component acquires the first identifier before the function is specified by the specification component, and acquires the second identifier in response to a determination by the determination component that the role is not included in the first role.

13. The multifunction printer according to claim 12, wherein
the function is a copy function or a print function.

14. The multifunction printer according to claim 12, wherein
the function is writing data to a wireless tag.

15. The multifunction printer according to claim 12, wherein
the role management system is configured to communicate between the multifunction printer and a server via a communication network.

* * * * *